Patented June 14, 1927.

1,632,454

UNITED STATES PATENT OFFICE.

CARL A. SAHLBERG, OF CHICAGO, ILLINOIS.

METHOD OF CANNING MEATS.

No Drawing.   Application filed June 17, 1926.   Serial No. 116,745.

This invention relates to a method of canning meat and especially fried or roasted turkey, chicken, goose, duck, fish, etc., and it is an object of the invention to provide a method of this kind wherein the meat is initially slightly seared and then loosely packed and sealed in a can and treated in a manner whereby the air within the can will operate to further continue the desired roasting or frying action.

In my improved method, I first slightly sear by frying or roasting the meat to be preserved and then pack it loosely in cans. After the cans have been sealed they are placed in a retort for a length of time necessary to have the food completely cooked. The retort is maintained filled with live steam whereby is eliminated the cans' bursting when heated.

By packing the cans loosely enough air is left in the cans to continue the already started cooking. The oxygen of the air in the can is used up by the continued cooking leaving only the nitrogen, an inert gas, which cannot injure the food.

I claim:—

1. A method of canning meat consisting in initially searing the meat and packing it loosely in cans, sealing the cans and then placing them in a retort for a period of time necessary to complete the cooking action of the meat within the cans.

2. A method of canning meat consisting in initially searing the meat and packing it loosely in cans, sealing the cans and then placing them in a retort for a period of time necessary to complete the cooking action of the meat within the cans, and in filling the retort with steam to prevent bursting of the cans when heated.

In testimony whereof I hereunto affix my signature.

CARL A. SAHLBERG.